United States Patent
Leveque

(10) Patent No.: US 10,871,390 B2
(45) Date of Patent: Dec. 22, 2020

(54) PISTON TEST INSTRUMENT FOR CALIBRATION AND/OR GAUGING OF A FLOW METER AND/OR FOR DETERMINING A FLOW RATE OF A MEASURED MEDIUM

(71) Applicants: L'ATELIER DE MATOURNE S.A.S, Flayosc (FR); Vincent Mickael Anthony Leveque, Flayosc (FR)

(72) Inventor: Vincent Mickael Anthony Leveque, Flayosc (FR)

(73) Assignee: L'ATELIER DE MATOURNE, S.A.S, Flayosc (FR)

( * ) Notice: Subject to any disclaimer, the term of this patent is extended or adjusted under 35 U.S.C. 154(b) by 226 days.

(21) Appl. No.: 15/924,739

(22) Filed: Mar. 19, 2018

(65) Prior Publication Data

US 2018/0306624 A1  Oct. 25, 2018

(30) Foreign Application Priority Data

Apr. 21, 2017 (FR) ...................... 17 53465

(51) Int. Cl.
*G01F 3/16* (2006.01)
*G01F 25/00* (2006.01)
*G01N 35/00* (2006.01)

(52) U.S. Cl.
CPC ............ *G01F 3/16* (2013.01); *G01F 25/0015* (2013.01); *G01N 35/00693* (2013.01)

(58) Field of Classification Search
CPC .... G01F 25/0015; G01F 25/0007; F04B 1/00; F04B 17/00; F04B 25/00; F04B 43/00; F04B 53/101

USPC ..... 73/1.01, 1.16, 1.19, 1.22, 1.73, 239, 252
See application file for complete search history.

(56) References Cited

U.S. PATENT DOCUMENTS

| | | | | |
|---|---|---|---|---|
| 4,231,722 A * | 11/1980 | Teichmann | ............. | F04B 17/00 417/418 |
| 5,392,632 A * | 2/1995 | Umeda | ............... | G01F 25/0015 73/1.73 |
| 8,511,138 B2 * | 8/2013 | Larsen | ................ | G01F 25/0015 73/1.19 |
| 8,826,717 B2 * | 9/2014 | Van Bekkum | ...... | G01F 25/0015 73/1.22 |
| 8,950,235 B2 * | 2/2015 | Heath | ................. | G01F 25/0007 73/1.19 |
| 2009/0191073 A1 * | 7/2009 | Kopecek | ............... | F04B 17/044 417/415 |

(Continued)

FOREIGN PATENT DOCUMENTS

EP 2773926 A1 9/2014

*Primary Examiner* — Randy W Gibson
*Assistant Examiner* — Gedeon M Kidanu
(74) *Attorney, Agent, or Firm* — Bacon & Thomas, PLLC

(57) ABSTRACT

A piston test instrument for calibration and/or gauging of a flow meter and/or for determining a flow rate, wherein the piston test instrument has a tubular housing having an inlet, via which a measured medium is introducible into the housing, and having an outlet, via which the measured medium is dischargeable from the housing, wherein the piston test instrument has a piston arranged in the housing, wherein the piston test instrument has a drive device, which is designed for moving the piston by way of contactless, magnetic force transmission by a drive device.

13 Claims, 3 Drawing Sheets

(56) References Cited

U.S. PATENT DOCUMENTS

| | | | | |
|---|---|---|---|---|
| 2012/0024037 A1* | 2/2012 | Massey | ............... | G01F 25/0015 73/1.19 |
| 2013/0104621 A1* | 5/2013 | Larsen | ................ | G01F 25/0015 73/1.19 |
| 2014/0331738 A1* | 11/2014 | Brown | ................ | G01F 25/0015 73/1.19 |
| 2018/0017429 A1* | 1/2018 | Noorlander | ......... | G01F 25/0015 |

* cited by examiner

PISTON TEST INSTRUMENT FOR CALIBRATION AND/OR GAUGING OF A FLOW METER AND/OR FOR DETERMINING A FLOW RATE OF A MEASURED MEDIUM

The present invention relates to a piston test instrument for calibration and/or gauging of a flow meter and/or for determining a flow rate of a measured medium, and a use of the piston test instrument and a method for measuring a flow rate of a measured medium.

Piston test instruments are used as high-precision meters in the calibration of meters for process metrology, in particular in the calibration of flow meters. The calibration conditions, for example, the temperature, the pressure, and the ambient humidity, are monitored with ultrahigh precision in this case, to correspond to the certification conditions of the respective calibration authorities, for example, according to API, OIML, and/or GOST.

Recently, transportable piston test instruments, so-called SVP's (Small Volume Provers) have become known. Such a transportable piston test instrument is installed on a transportation platform and can be transported using a truck to the location of the flow meter to be calibrated.

In the known piston test instruments, the displacement of the piston into a starting position is typically performed by a piston rod. In this regard, reference is made, inter alia, to EP 2 773 926 A1, in particular to FIG. 1 of this document. The piston test instrument disclosed therein enables the movability of the piston by means of a final control element and a motor, which is arranged inside the housing of the piston test instrument. In this case, the enlargement of the housing in the longitudinal direction because of the space requirement for the piston rod, on the one hand, and the susceptibility of the motor in the case of the placement thereof within the housing, for example, when conducting cryogenic or hot media through the piston test instrument are problematic.

Proceeding from the above-mentioned prior art, it is the object of the present invention to provide a piston test instrument, which enables the calibration and/or gauging of a flow meter using a broad spectrum of different media, in particular also cryogenic media. The determination of a flow rate of a large spectrum of different measured media, in particular also cryogenic media, is also to be enabled by the piston test instrument.

Furthermore, the object of the present invention is the provision of a method for determining a flow rate, in particular of a cryogenic medium, by means of a piston test instrument.

The present invention achieves the object by way of a piston test instrument having the features of claim 1 and by way of a method having the features of claim 15.

Furthermore, a use having the features of claim 14 is according to the invention.

A piston test instrument according to the invention is used for calibration and/or gauging of a flow meter and/or for determining a flow rate of a measured medium. The measured medium can preferably be a cryogenic medium, in particular a cryogenic liquid. Such a medium is liquid under measuring conditions, but is gaseous at room temperature of 25° C. and normal pressure of 1 bar. Such gases are, inter alia, liquid oxygen, liquid gas, for example, propane or butane, liquid natural gas, liquid noble gases, and/or liquid nitrogen.

The piston test instrument according to the invention has a tubular housing having an inlet, via which a measured medium is introducible into the housing. The tubular housing has an outlet, via which the measured medium is dischargeable from the housing. Furthermore, the piston test instrument has a piston arranged in the housing The piston test instrument according to the invention additionally has a drive device, which is designed to move the piston by way of a contactless, magnetic force transmission of the drive device. The piston is thus movable by a contactless, magnetic force transmission of the drive device.

By way of the magnetic force transmission from the drive device to the piston, a piston rod and the seals connected thereto or the mechanical couplings and the motorized drives within the housing can be omitted. The drive device can be arranged outside the housing, whereby better thermal decoupling can be produced between the drive device and the medium guided in the housing.

Advantageous embodiments of the invention are the subject matter of the dependent claims.

The drive device can advantageously be arranged outside the housing of the piston test instrument. The maintenance of the drive device is thus facilitated and the drive device itself can operate with less interference due to the thermal decoupling. The dimensioning of the piston test instrument can additionally be substantially reduced.

The piston can advantageously have at least one first magnet and the drive device can have at least one second magnet. In this case, the magnets are advantageously aligned in relation to one another such that the piston is movable within the housing in one position by the movement of the second magnet of the drive device. Because of the magnetic repulsion forces of the two magnets, the piston can advantageously be moved by means of the drive device through the housing wall of the housing.

The tubular housing typically has a longitudinal axis. The first magnet can advantageously be part of a magnet ring, which is arranged inside the housing. It is referred to as the inner magnet ring. It advantageously has a plurality of magnets, which are arranged symmetrically in a ring frame inside the housing around a ring center. A more uniform distribution of the magnetic field along the housing wall is achieved by the ring-shaped arrangement of the magnets. Wedging of the magnet ring due to a yielding movement is therefore precluded, since magnetic forces can act distributed around the circumference at multiple points on the magnet ring. The magnet ring is ideally located concentrically in relation to the longitudinal axis of the tubular housing in this case.

The second magnet can advantageously be part of a magnet ring of the drive device. This magnet ring is referred to as the drive magnet ring. This magnet ring has a plurality of magnets. They are arranged symmetrically in relation to one another in a ring frame outside the housing around a ring center. In this case, the ring frame is located concentrically in relation to the longitudinal axis of the tubular housing. The uniform distribution of the magnets from the outside around the housing wall of the housing advantageously enables a more uniform distribution of the acting magnetic forces for moving the piston.

It is advantageous if the second magnet is mounted so it is linearly movable by a bearing device along a housing wall of the housing. The bearing can be designed as a roller body bearing. It can particularly advantageously comprise a roller body cage and roller bodies, in particular rollers.

The first magnet can advantageously be connected to a valve of the piston, which enables a conduction of the measured medium through the piston in the open state and prevents a conduction of the measured medium through the piston in the closed state. The valve has the open state if the first magnet is influenced by the magnetic force transmission of the second magnet. The valve can have the closed state if the first magnet is not influenced by the magnetic force transmission of the second magnet. There can additionally be a state in which the magnetic force which is transmitted is not sufficiently strong to overcome the closed state of the valve, for example, the spring force of a compression spring of the valve. This is the case, for example, if the drive magnet ring approaches the inner magnet ring, but the approach and the repulsion forces linked thereto are still too small to trigger a movement. However, this state can be overcome by an increasing approach. The closed state of the valve can therefore also be provided in the event of magnetic force transmission of small magnetic forces, but this can also only be an intermediate state between the closed state without any magnetic force action and the open state with greater magnetic force action. The advantage is that not only the movement of the piston, but rather also the opening state of the valve is determined at the same time by the magnetic force transmission, which would otherwise have to be ensured with a more complex design, for example, by an additional valve switch.

The piston can have a plate-shaped ring element having a valve seat and the valve can be designed as a poppet valve, having a head, a valve bushing, which is fixedly connected to the plate-shaped ring element, a valve shaft, which is movably arranged in the valve bushing and is connected to the head, and a compression spring, which is arranged between the valve bushing and the head. This type of valve is an uncomplicated type of valve which is less susceptible to mechanical failure, and which is well suitable for use in a piston test instrument.

The valve, in particular the head of the poppet valve, can advantageously cooperate with the valve seat of the ring element of the piston, so that the valve forms a closed measuring chamber jointly with the housing in the closed state. The measured medium is conducted through this measuring chamber. The volume of the measuring chamber is variable by the movement of the piston.

The respective volume of the measuring chamber, and the minimum and/or maximum volumes thereof, can be determined by a measuring device, for example, by a sensor or by a glass rod.

The drive device can comprise a pneumatic and/or hydraulic cylinder having a cylinder piston, which is connected to the second magnet of the drive device.

The hydraulic and/or pneumatic cylinder can additionally have at least one intake for the introduction of a propellant, preferably a propellant gas, for moving the cylinder piston and the second magnet on an axis parallel to the longitudinal axis of the housing. In this case, the axis preferably extends outside the housing of the piston test instrument.

The first and/or the second magnet, preferably all magnets of the inner magnet ring and/or the drive magnet ring, can advantageously be designed as a permanent magnet, preferably as a neodymium-containing permanent magnet, particularly preferably as a permanent magnet made of a neodymium-iron-boron alloy. An operation by electromagnets is also possible, but is more susceptible to failure. At least for the inner magnet ring, the advantageous use of permanent magnets suggests itself, because otherwise a power supply source for the electromagnets would have to be arranged inside the housing.

The piston test instrument can additionally have an outer shell, which defines an inner chamber, in which at least the housing and the drive device of the piston test instrument are arranged, wherein the inner chamber is filled with inert gas. This is advantageous so that ice does not accumulate due to ambient humidity, for example, on the housing wall, which could obstruct the movement of the drive magnet ring along the housing.

The use of the piston test instrument according to the invention for the calibration and/or gauging of a flow meter using a cryogenic measured medium, preferably a liquefied gas, which is gaseous at 25° C. and under normal pressure, particularly preferably using a liquid gas and/or a liquefied natural gas, is furthermore according to the invention.

The use of the piston test instrument according to the invention for determining a flow rate of the above-mentioned measured medium is also according to the invention.

A method according to the invention for measuring a flow rate of a measured medium, in particular a flow rate of a cryogenic measured medium, by way of a piston test instrument, preferably by way of a piston test instrument according to the invention, wherein the piston test instrument has a tubular housing having an inlet and an outlet, a piston arranged in the housing, and a drive device, has the following steps:

a) feeding the measured medium into the inlet of the housing of the piston test instrument;

b) executing a flow rate measurement by moving the piston from a starting position in the region of the inlet into an end position in the region of the outlet;

c) returning the piston into the starting position by moving the piston by way of the drive device.

The movement of the piston in step c) is performed in the method according to the invention by way of a contactless, magnetic force transmission between the drive device and the piston.

The invention will be explained in greater detail hereafter on the basis of a specific exemplary embodiment with the aid of the appended figures. The subject matter of the invention is not restricted to the exemplary embodiment, however. Manifold modification variants of individual elements of the exemplary embodiment are also possible and fall under the scope of protection of the present claims. In the figures:

Figure 1:
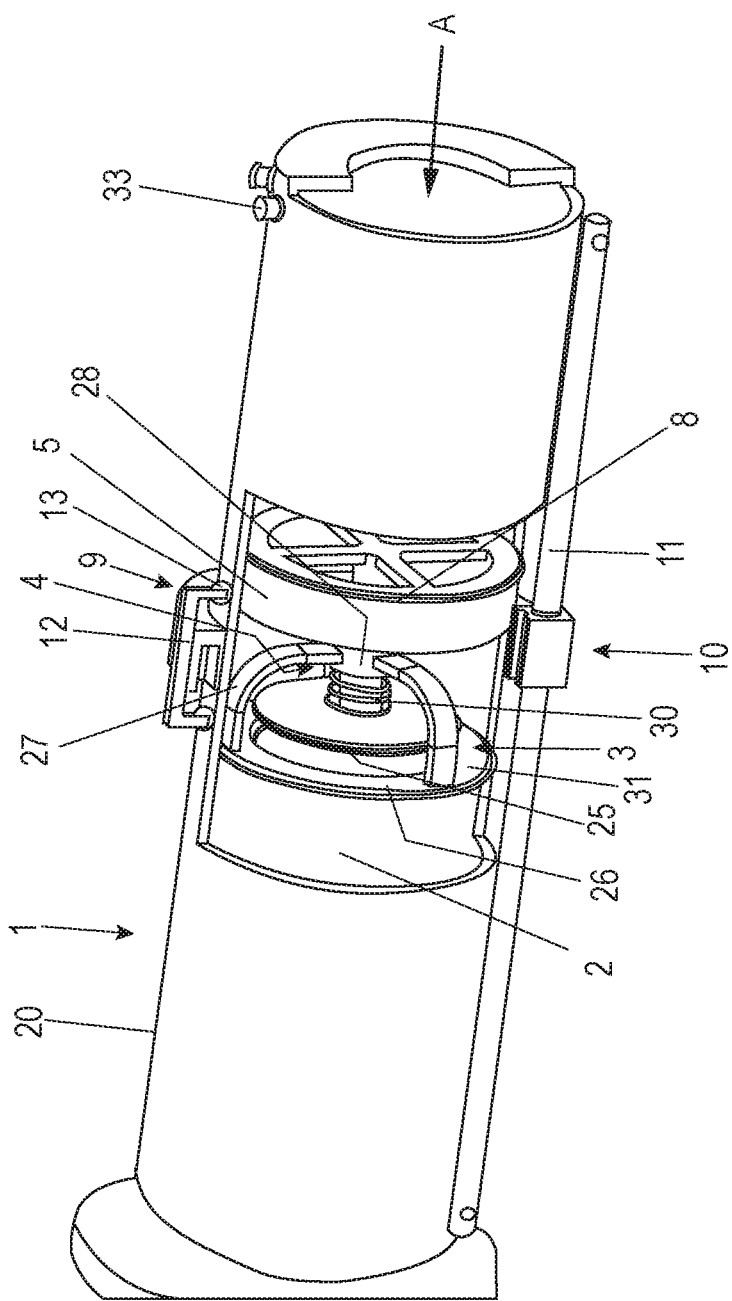
FIG. 1 shows a first perspective view of an embodiment variant according to the invention of a piston test instrument for ascertaining a flow rate.

FIG. 1 shows a piston test instrument 1 having a tubular housing 20, which has at least one measuring chamber 2 and a piston 3 having a valve 4. The valve 4 can preferably be designed as a poppet valve or also preferably as a flow valve.

Figure 3:
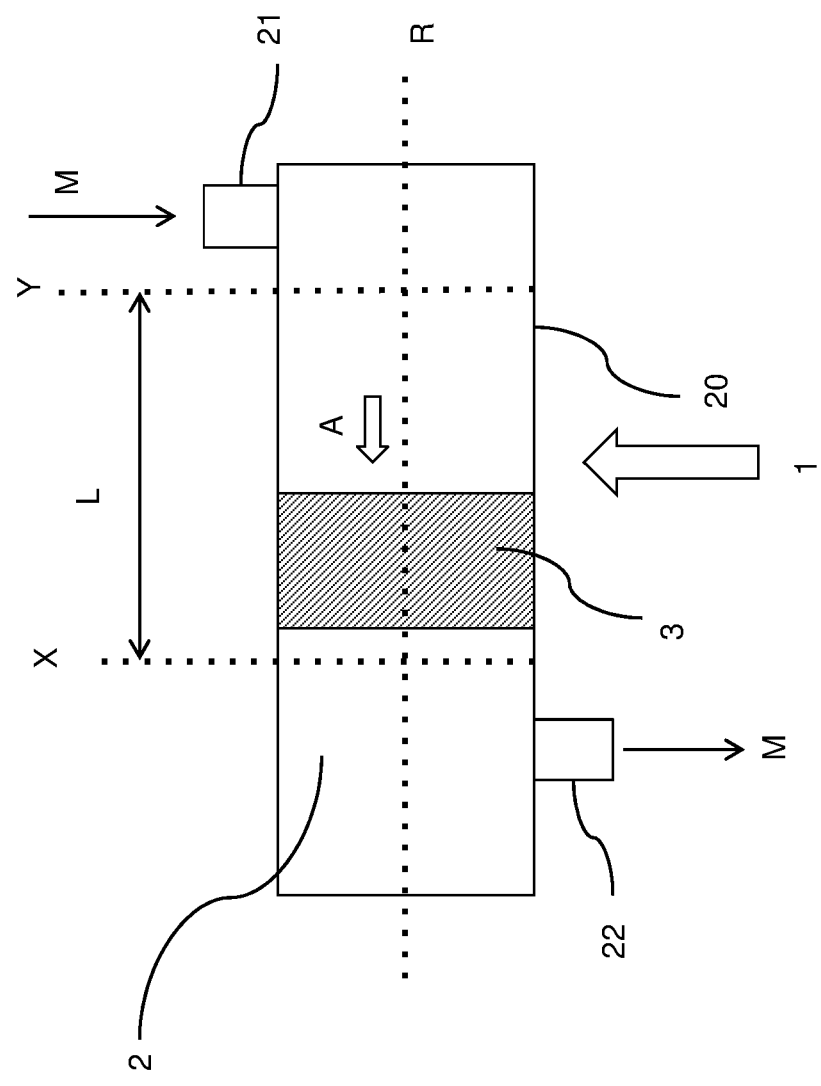
FIG. 3 shows a schematic illustration of the functionality of the piston test instrument.

FIG. 3 shows a schematic, very simplified construction of a piston test instrument according to the invention. Firstly, the functionality of the piston test instrument 1 according to the invention will be described on the basis of FIG. 3. The piston test instrument 1 operates in repeating work cycles.

Proceeding from a starting position Y, in which the outlet-side measuring chamber 2 has a maximum volume, the piston 3 of the piston test instrument 1 is moved in an advance direction A by way of a measured medium M flowing into the measuring chamber 2 through an inlet 21.

The measuring chamber 2 is tubular and has a longitudinal axis R. The piston is moved because of the medium pressure in the direction of the outlet 22, wherein the measuring chamber 2 shrinks because of the piston movement. If the piston 3 reaches a specific position, the medium can thus be discharged through the outlet 22 from the measuring chamber 2. This position corresponds to an end position X of the piston 3, in which the measuring chamber has a minimum volume. The piston 3 is then moved by a drive device (not shown in greater detail) in a working stroke, opposite to the advance direction A, back into the starting position Y.

Drive devices transmit a force to the piston in the previous prior art at least by way of a piston rod having a rod longitudinal axis which is arranged on the longitudinal axis of the measuring chamber. This piston rod can advantageously be omitted in the piston test instrument according to the invention.

The housing 20 has an inlet 21 and an outlet 22 for the supply of the measuring medium into the measuring chamber 2. The inlet 21 defines an inflow side and the outlet defines an outflow side of the piston test instrument 1. A measured medium M flows through the housing 20 at least regionally, which measured medium defines an advance direction A of the piston 3 due to the medium pressure acting on the piston 3.

The piston test instrument 1 can be mounted on a transportation platform and can therefore be used similarly to known SVP's as a Small Volume Prover.

The working stroke of the piston test instrument 1, by which the piston 3 is displaced back into the starting location with minimum measuring chamber volume, is exclusively achieved by magnetic forces.

Of course, the inlet-side region 7 of the piston test instrument can also be used as a measuring chamber. In this case, the designation with respect to the minimum volume and the maximum volume of the measuring chamber in the corresponding starting position Y and end position X is to be understood as inverted accordingly.

A drive magnet ring 5 is arranged outside the tubular, in particular cylindrical housing 20. This magnet ring has a plurality of magnets 101, preferably permanent magnets The number of the magnets can preferably be more than eight, in particular more than 16 magnets.

The magnets can preferably consist of a neodymium-containing alloy, in particular a neodymium-iron-boron alloy.

The piston 3 has an inner magnet ring 8. This inner magnet ring 8 has a magnet ring center point, which, like the magnet ring center point of the drive magnet ring 5, is located on the center axis R of the housing 20.

The inner magnet ring 8 is preferably at a distance of less than 5 cm, in particular less than 2 cm, from the wall of the housing 20.

The inner magnet ring 8 preferably also has a plurality of magnets 102, particularly preferably a plurality of permanent magnets.

The number of the magnets can preferably be more than eight, in particular more than 16 magnets.

The magnets of the inner magnet ring 8 can preferably consist of a neodymium-containing alloy, in particular a neodymium-iron-boron alloy.

The inner magnet ring 8 and the drive magnet ring 5, in particular the respective magnets of the magnet rings, are arranged such that they repel one another. The poles of the magnets of the inner magnet ring 8 and the adjacent poles of the magnets of the drive magnet ring 5 therefore have the same polarity.

The piston test instrument 1 has bearing means 9, for mounting the drive magnet ring 5 coaxially in relation to the longitudinal axis R of the housing 20. These bearing means 9 enable a movement of the drive magnet ring 5 in an advance direction A along the housing 20. The bearing means 9 are arranged outside the housing 20 in this case and can preferably be designed as a roller and/or roller body bearing.

The drive magnet ring 5 can, for example, preferably be guided on the roller body cages 12 using roller bodies 13, in particular by means of rollers, on the housing wall of the housing 20, wherein the roller body cage is connected to the drive magnet ring 5. The housing can have running surfaces for guiding the roller bodies along its external surface, for example.

Alternatively, another movable mounting of the drive magnet ring outside the housing 20 along the housing wall can also be performed. Thus, for example, a friction mounting along friction surfaces of the housing wall can also be provided.

The linear movement of the drive magnet ring 5 along the housing wall can be produced by a drive unit 10, preferably by a pneumatic cylinder 11. This enables the entire working stroke of the piston 3. Alternatively to the pneumatic cylinder 11, a hydraulic cylinder can also be used.

The pneumatic cylinder 11 can preferably be connected directly to the drive magnet ring 5, without a piston rod. The pneumatic cylinder 11 can be arranged along the entire working distance I of the piston 3 in this case, which the piston 3 executes during a working stroke. It can also be used for guiding the drive magnet ring 5 in this case.

The pneumatic cylinder 11 is preferably designed as a rodless cylinder and also preferably has one or two intakes (not shown in greater detail) at the end, for the supply and/or discharge of a propellant gas. Furthermore, the pneumatic cylinder 11 has a cylinder piston (also not shown in greater detail), which is connected to the roller body cage 12.

The cylinder piston of the cylinder 11 can be moved by feeding gas, for example, air or an inert gas, in particular compressed air, into the intakes at the end of the pneumatic cylinder. The roller body cage 12 is thus moved and therefore the drive magnet ring 5 is also set into a linear movement, for example, in the flow direction of the measured medium or opposite to the flow direction of the measured medium.

The piston 3 can be put in a starting position Y by magnetic interaction of the drive magnet ring 5 with the inner magnet ring 8.

The drive magnet ring 5 is always on the outflow side from the inner magnet ring 8 because of its polarization or because of the polarization of its magnets.

The inflow side of the pneumatic cylinder 11 corresponds to the inflow side of the measured medium M into the piston test instrument 1.

By way of feeding of propellant gas on the inflow side into the pneumatic cylinder 11, a forward pressure of the drive magnet ring 5 begins pushing it against the advance direction of the measured medium M into the starting position Y or to the inlet.

Figure 2:
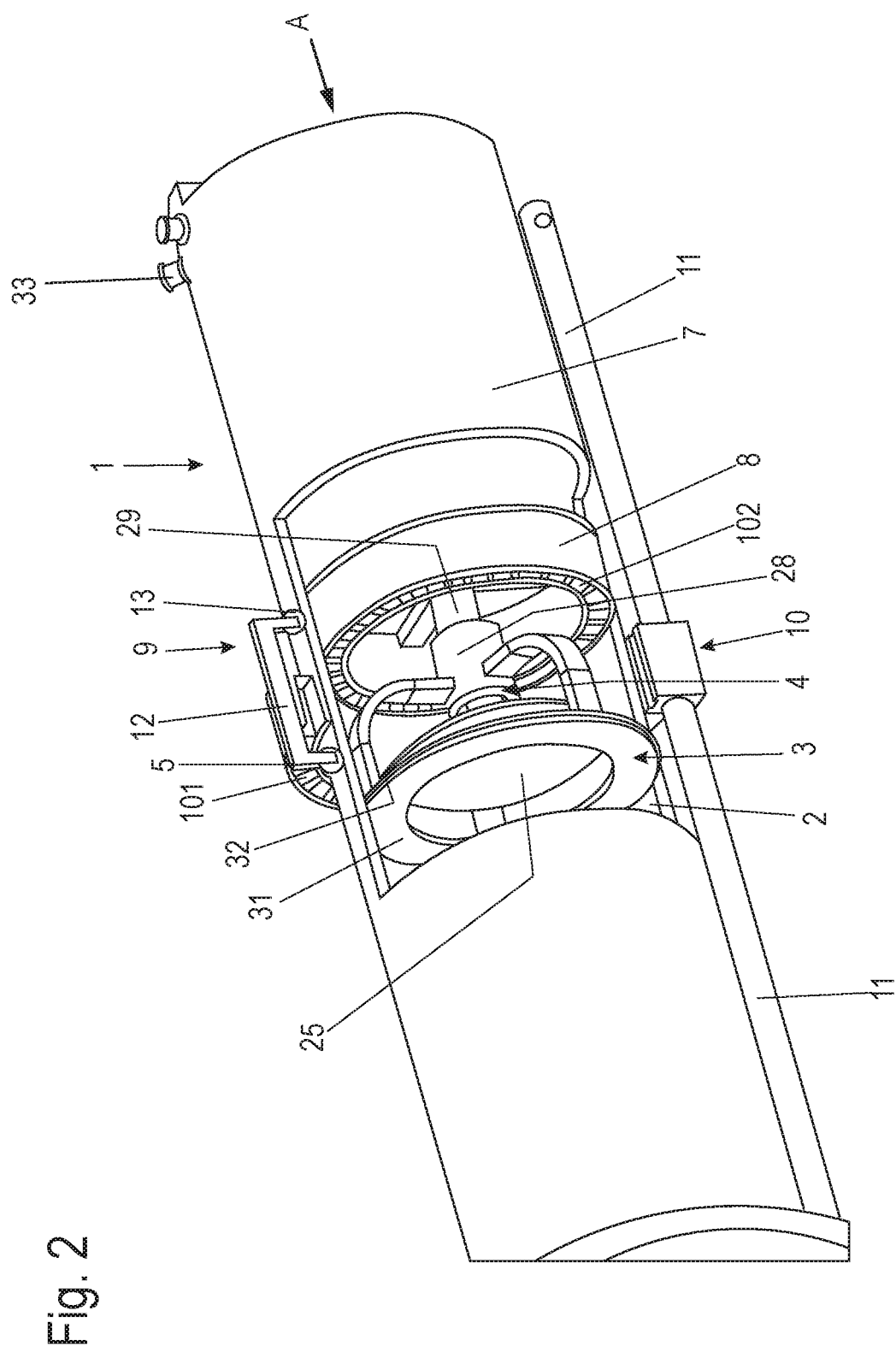
FIG. 2 shows a second perspective view of the embodiment variant of FIG. 1.

The piston 3 comprises a poppet valve as the valve 4 in the exemplary embodiment of FIGS. 1 and 2. It has a head 25, which forms a closed surface jointly with a ring-shaped valve seat 26 of the piston 3 in the closed state of the valve. The ring-shaped valve seat 26 is part of a plate-shaped ring element 31 which is connected via metal strips 27 to a central sleeve-shaped valve bushing 28. A valve shaft 29 of the poppet valve, which is connected to the head 25, is arranged inside the valve bushing 28. The valve shaft 29 is arranged so it is linearly movable in relation to the valve bushing 28.

The metal strips 27 form a cage, which is used as a stop for the head of the poppet valve in the open state. The valve 4 additionally has a compression spring 30, which is arranged between the head 25 and the valve bushing 28 and presses the head 25 into the valve seat 26. Furthermore, the valve shaft 29 is fixedly connected to the inner magnet ring 8.

The plate-shaped ring element 31 of the piston 3 has a piston seal 32 on its radial outer side, to prevent a passage of the measured medium at the edge into the measuring chamber 2.

In the open state of the valve 4, the measured medium M can flow through the piston 3, without the piston 3 being moved in the advance direction A. The open state of the valve can be maintained, for example, by one or more electromagnets 33 arranged in the housing 20 on the incoming flow side in relation to the valve 4. The inner magnet ring 8 is held by the electromagnets. The valve shaft 29 and the head 25 are therefore drawn into the open position in the direction of the electromagnets 33 above the valve seat 26. Upon activation of a work cycle of the piston test instrument 1, the electromagnets 33 are deactivated and the head 25 is pressed by the medium pressure and possibly by the spring force of the compression spring 30 into the valve seat 26, which results in closure of the piston. The measured medium then presses on the piston 3 and conveys it in the advance direction A until a minimum volume of the measuring chamber 2 is achieved or until the piston reaches a stop point or the end position X. A flow rate can be ascertained on the basis of the time in which the piston 3 is moved from the starting position Y into the end position X, if the volume of the measuring chamber is known and if the ambient conditions are known.

The measurement is repeated within many work cycles. In this case, the piston 3 is moved into the starting position Y by the drive device arranged outside the housing 20 and by means of the linearly movable arrangement of the two magnet rings, i.e., the drive magnet ring 5 and the inner magnet ring 8 of the piston 3.

During the movement opposite to the advance direction A, the drive magnet ring 5 acts on the inner magnet ring 8. The inner magnet ring 8, which is connected to the valve shaft 29, thus pulls the head 25 away from the valve seat 26 against the spring force of the compression spring 30, so that the valve 4 opens. The measured medium M can thus again flow through the ring gap of the piston 3 formed between the head 25 and the valve seat 26. The drive magnet ring 5, which is set into motion by the pneumatic cylinder, puts the piston 3 with the valve 4 and the inner magnet ring 8 into the starting position Y by linear movement. Upon reaching the starting position Y, the electromagnet or the electromagnets 33 is/are activated.

The inner magnet ring 4 is held in its position by attraction forces of the electromagnet 33 or the electromagnets 33.

The drive magnet ring 5 can be moved in the starting position Y of the piston to the outflow side of the piston test instrument 1, for example, by introducing a propellant gas into the incoming-flow-side intake opening of the pneumatic cylinder 11. This can also be performed by suctioning of the cylinder piston by applying partial vacuum to an inlet opening of the pneumatic cylinder.

By deactivating the electromagnets 33, the inner magnet ring 8 is released, which now no longer holds the compression spring 30 in its compressed position. The poppet valve is closed by the medium pressure and possibly by the spring force of the compression spring 30. The introduced measured medium M moves the piston 3 in the advance direction A.

A sensor or a measuring element, for example, a glass measuring rod, can measure the stroke I of the piston 3 very accurately. By measuring the pulses, the frequency, the stroke time, and preferably by using a double chronometry technique, according to ISO 7278-3, an accurate determination of the volume flow and the flow rate can be ascertained and a calibration and/or a gauging of a flow meter can be performed.

When the piston 3 reaches an end position X of a stroke, the inner magnet ring 8 comes into the vicinity of the repulsion forces of the drive magnet ring 5. The inner magnet ring 8 and the valve shaft 29 connected thereto are then moved opposite to the advance direction A, so that the spring force of the compression spring 30 is overcome and the poppet valve opens.

Since no mechanical parts inside and outside the measuring chamber 2 have to be sealed during the movement, the piston test instrument according to the invention is particularly suitable for cryogenic applications, preferably for cryogenic applications using liquid measured media at a temperature of less than −150° C., for example, liquid natural gas.

The housing 20 of the piston test instrument according to the invention can preferably consist of a non-magnetizable material, for example, a non-magnetizable metal, particularly preferably of steel, in particular of an austenitic rust-proof steel or austenitic stainless steel, for example, 304 or 316 SS (stainless steel).

The piston and individual components of the pneumatic cylinder can preferably also be finish-ground or chromed along the surface thereof.

In the previous prior art, piston rods were always guided inside the housing of the piston test instrument to reset the piston. They required special seals. The movement of the piston by magnetic force with mechanical decoupling from the drive unit prevents the freezing of the typically used piston rod and the penetration of moisture from the air into the measuring chamber. It can now be fully closed except for the inlet and outlet of the measured medium. Neodymium-containing magnets are particularly suitable for a cryogenic application, because they have already been successfully used, inter alia, in the field of superconductors at −196° C.

Since the pneumatic cylinder 11 is arranged very close to the housing 20 of the piston test instrument 1, it can preferably be operated using helium as the propellant gas, to thus prevent entry of ambient humidity and freezing of the cylinder piston of the pneumatic cylinder.

To prevent icing from the outside, the housing 20 of the piston test instrument and all further elements of the piston test instrument 1 outside the housing 20 can be enclosed using an outer shell, which is flooded using an inert gas, for example, helium. No ambient humidity thus accumulates on the housing wall of the housing 20 or on the roller body 12, the runways for the roller bodies, and the like.

LIST OF REFERENCE SIGNS 1 piston test instrument
2 measuring chamber
3 piston
4 valve
5 drive magnet ring
7 inlet-side region
8 inner magnet ring
9 bearing means
10 drive unit
11 pneumatic cylinder 12 roller body cage
13 roller body
20 housing
21 inlet
22 outlet
25 head
26 valve seat
27 metal strips
28 valve bushing
29 valve shaft
30 compression spring
31 ring element
32 piston seal
33 electromagnets
101 magnet (drive magnet ring)
102 magnet (inner magnet ring)

The invention claimed is:

1. A piston test instrument (1) for calibration and/or gauging of a flow meter and/or for determining a flow rate, wherein the piston test instrument (1) has a tubular housing (20) having an inlet (21), via which a measured medium (M) is introducible into the housing (20), and having an outlet (22), via which the measured medium (M) is dischargeable from the housing (20),
   wherein the piston test instrument (1) has a piston (3) arranged in the housing (20), wherein the piston test instrument (1) has a drive device (10), wherein the piston (3) is movable by a contactless, magnetic force transmission of the drive device (10);
   wherein the drive device (10) is arranged outside the housing (20) of the piston test instrument (1) wherein the piston (3) has at least one first magnet (102) and wherein the drive device (10) has at least one second magnet (101) and wherein the magnets (101, 102) are aligned in relation to one another such that the piston (3) is movable in a position (X) by the movement of the second magnet (101) of the drive device (10) inside the housing (20).

2. The piston test instrument according to claim 1, wherein the tubular housing (20) has a longitudinal axis (R), and the at least one first magnet (102) is part of an inner magnet ring (8) having a plurality of magnets (102) which are arranged symmetrically in a ring frame inside the housing (20), wherein the ring frame is located concentrically in relation to the longitudinal axis (R) of the tubular housing (20).

3. The piston test instrument according to claim 1, wherein the drive device (10) comprises a pneumatic and/or hydraulic cylinder (11) having a cylinder piston, which is connected to the second magnet (101), and having at least one intake for introduction of a propellant, preferably a propellant gas, for moving the cylinder piston and the second magnet (101) on an axis parallel to the longitudinal axis (R) of the housing (20).

4. The piston test instrument according to claim 1, wherein in that the piston test instrument (1) has an outer shell, which defines an inner chamber, in which at least the housing (20) and the drive device (10) of the piston test instrument (1) are arranged, wherein the inner chamber is filled with inert gas.

5. A method of calibration and/or gauging of a flow meter with the piston test instrument (1) according to claim 1, comprising the step of calibrating and/or gauging the flow meter with said piston test instrument (1) using a cryogenic measured medium (M), which is gaseous at 25° C. and under normal pressure.

6. The piston test instrument according claim 1, wherein the at least one second magnet (101) is part of a drive magnet ring (5) of the drive device (10) having a plurality of magnets (101), which are arranged symmetrically in a ring frame outside the housing (20), wherein the ring frame is located concentrically in relation to the longitudinal axis (R) of the tubular housing (20).

7. The piston test instrument according to claim 6, wherein the first and/or second magnet (101, 102), preferably all magnets (101, 102) of the inner magnet ring (8) and/or the drive magnet ring (5), is designed as a permanent magnet, preferably a neodymium-containing permanent magnet, particularly preferably as a permanent magnet made of a neodymium-iron-boron alloy.

8. The piston test instrument according to claim 1, wherein the at least one second magnet (101) is mounted by one or more bearing means (9) so it is linearly movable along a housing wall of the housing (20).

9. The piston test instrument according to claim 8, wherein the second magnet (101) is arranged mounted on roller bodies so it is movable along the housing wall of the housing (20).

10. The piston test instrument according to claim 1, wherein the at least one first magnet (102) is connected to a valve (4) of the piston (3), which enables conduction of the measured medium (M) through the piston (3) in an open state and prevents conduction of the measured medium (M) through the piston (3) in a closed state, wherein the valve (4) has the open state if the first magnet (102) is influenced by the magnetic force transmission of the second magnet (101).

11. The piston test instrument according to claim 10, wherein in the valve (4) has the closed state if the at least one first magnet (102) is not influenced by a magnetic force transmission of the second magnet (101).

12. The piston test instrument according to claim 10, wherein the piston (3) has a plate-shaped ring element (31) having a valve seat (26), and the valve (4) is designed as a poppet valve, having a head (25), a valve bushing (28), which is fixedly connected to the plate-shaped ring element (31), a valve shaft (29), which is movably arranged in the valve bushing (28) and is connected to the head (25), and a compression spring (30), which is arranged between the valve bushing (28) and the head (25).

13. A method for measuring a flow rate of a measured medium (M), in particular a flow rate of a cryogenic measured medium (M), by way of a piston test instrument (1),
   wherein the piston test instrument (1) has a tubular housing (20) having an inlet (21) and having an outlet (22), a piston (3) arranged in the housing (20), and a drive device (10) arranged outside of the housing (20),
   wherein the method comprises the following steps:
   a) feeding the measured medium (M) into the inlet (21) of the housing (20) of the piston test instrument (1);
   b) executing a flow rate measurement by moving the piston (3) from a starting position (Y) in the region of the inlet (21) into an end position (X) in the region of the outlet (22);
   c) returning the piston (3) into the starting position (Y) by moving the piston (3) by way of the drive device (10), wherein the moving of the piston (3) in step c) is performed by a contactless, magnetic force transmission between the drive device (10) and the piston (3).

* * * * *